Nov. 26, 1963    H. MARTIN ETAL    3,112,432
DRY RECTIFIER DEVICE
Filed July 31, 1958
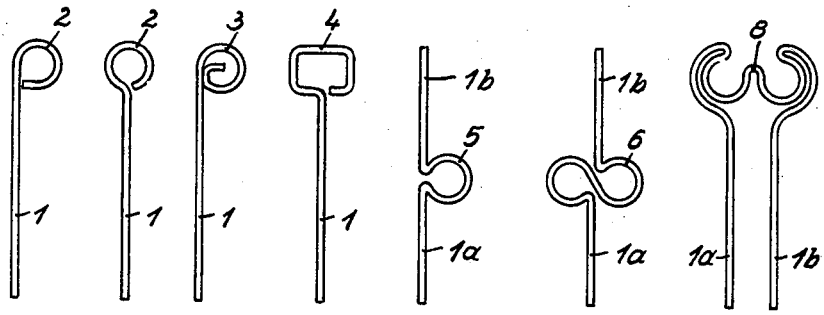
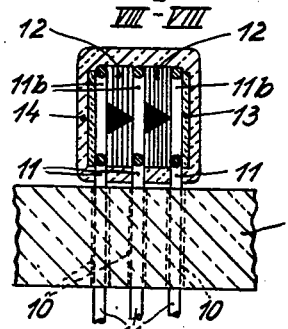
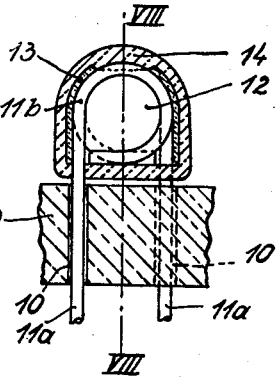
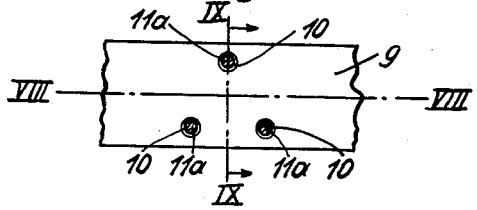
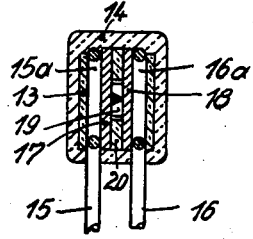

United States Patent Office 3,112,432
Patented Nov. 26, 1963

3,112,432
DRY RECTIFIER DEVICE
Heinz Martin, Berlin-Siemensstadt, and Heinz Schneider, Berlin-Haselhorst, Germany, assignors to Siemens-Schuckertwerke Aktiengesellschaft, Berlin - Siemensstadt, Germany, a corporation of Germany
Filed July 31, 1958, Ser. No. 752,264
Claims priority, application Germany Aug. 13, 1957
1 Claim. (Cl. 317—234)

Our invention relates to dry rectifier devices, such as selenium rectifiers, of small rated power, and particularly to rectifiers that are composed of rectifier pellets and are suitable for use as self-supporting units to be inserted into a through-conductor, such as a wire line or a printed circuit. Such use, aside from requiring slight weight and minimum space of the rectifier units, makes it desirable to design the rectifier terminal members in such a manner that they can readily be bent in any desired directtion for adapting the unit to any given configuration of the conductor line or circuit into which the unit is to be inserted.

It is known to provide such rectifier units with a housing that encloses a stack of pellets and has a number of slots through which the terminal wires are inserted. Each of the terminal wires, made of elastic material, has an end portion shaped as a conical spiral and located between the pellets of the rectifier stack to serve as a terminal electrode. The end portion of the wire, compressed between the pellets, also acts as a spring which presses the rectifier pellets against each other within the housing. This requires a wire material of suitable elastic stiffness and little bendability.

It is an object of our invention to provide a pellet type rectifier unit that lends itself more readily than the known devices to being connected with, or inserted in, a conducting path or circuitry of any configuration, and that combines particularly small space requirement with a simplified design well suitable for low cost manufacture by mass production methods.

To this end, and in accordance with a feature of our invention, the terminal members of the rectifier unit are formed of wires consisting of a normal, easily bendable wire material without spring action which have a portion bent into a flat area shape so as to form a contacting member which, together with the rectifier plates or pellets, are located within the stack which, if required, may also comprise intermediate layers of insulating material.

The stack or column thus composed, is provided with an enclosure of insulating material which, according to another feature of our invention, serves also as a mechanical tensioning device for imposing pressure upon the rectifier stack so that a separate tensioning device can be dispensed with. This is particularly advantageous when making the insulating enclosure of a shrinkable substance, particularly in form of a hose, consisting of a suitable synthetic resinous material. Favorably applicable for this purpose are hose-shaped pieces of a synthetic material, such as polyvinyl chloride, which can be produced in pre-stretched condition. If a hose-shaped body of such material is subjected to heat treatment, the stretched condition artificially imposed upon the body is released so that the hose automatically shrinks back to the dimensions existing prior to stretching.

After placing such a hose-shaped enclosure upon the rectifier stack, the stack components located at the open ends of the hose are still exposed. For sealing the rectifier unit on all sides, a protective enclosure can be added, for example by injection molding or by immersing the assembly into a molten casting resin, for example an epoxy resin or ethoxylin resin. The casting resin may be of the cold-hardening or of the warm-hardening type. After immersion in casting resin, the protective enclosure hardens or, in some cases, it must be subjected to a short additional heat treatment, for example by hot air. We have found that, when using a cold-hardening synthetic resin, it is often preferable to subject the assembly to additional heating for reducing the time required for curing and hardening. In this manner, the curing time has been reduced to a considerable extent, as is preferable for mass production.

A rectifier device according to the invention occupies extremely little space, and the connecting wires extending out of the insulating enclosure can readily be bent to any desired shape, if necessary, even at points in the immediate proximity to the insulating enclosure and at a sharp angle. The flat or planar area portion of the terminal wire at the place where it lies adjacent and between the pellets of the rectifier stack, may have the shape of a spiral, but other area-defining shapes are also applicable. For example, the wire may be bent simply to the shape of a loop of round, rectangular or any other desired planar configuration. In many cases, it is desirable to adapt the shape of the loop to the periphery of the rectifier pellets.

It is often desirable to give the terminal wires a given position relative to the stack at the point where they extend out of the stack, so that the exposed and protruding connector portions of the wires have a predetermined mutual spacing from each other. For that reason, the stack end of each terminal wire may be bent to the shape of a circular eye, with the outwardly extending wire portion extending tangentially to the eye. According to another feature of the invention, the bent, area-defining portion of the terminal wire is located, not at the end of the wire but at some other place along the length of the wire. In this manner, each wire can be given two outwardly extending connector portions both having either the same direction or respectively different directions.

One way of assembling a rectifier device according to the invention is to first place the necessary number of terminal wires into a jig which holds the bent area-covering portions mechanically together; then shoving the rectifier pellets between the area portions of the wires; thereafter placing the tensioning device and the insulating enclosure, or, if desired, placing a shrinkable sleeve upon the assembled stack, which sleeve simultaneously or subsequently operates as the tensioning device in the manner explained above. Thereafter, the completed assembly can be taken out of the jig for further processing in any suitable manner, for example to effect shrinking of the pre-stretched sleeve of synthetic resin, and, as the case may be, to coat the entire unit by dipping or injection-molding with a casting resin. However, if the terminal wires are very thin, the assembling work can also be effected by means of a gauge or jig into which the various components of the rectifier column, including the area-forming portions of the terminal wires are inserted in the proper order.

The foregoing and more specific objects, advantages and features of our invention will be apparent from, and will be mentioned in, the following in conjunction with the drawing, in which FIGS. 1 to 7 illustrate different examples of terminal wires which have each a bent portion for forming a planar area contact between the plates or pellets of the rectifier stack.

FIG. 8 shows an axial section, FIG. 9 a cross section, and FIG. 10 a bottom view of a rectifier unit according to the invention together with an auxiliary holder used for the manufacture of the unit, these illustrations showing the rectifier unit on enlarged scale.

FIG. 11 is an axial section through another embodiment of a rectifier unit according to the invention.

All illustrations are on an enlarged scale (about five times enlarged on the original patent drawings).

The connecting wire shown in FIG. 1 consists of a readily bendable material, generally of the character of tie wire, and has a straight elongated portion 1 and an end portion 2 bent to the shape of a circular eye. The portion 2 defines a planar area contact for engagement with a rectifier pellet as will be described below. The straight portion 1 of the wire extends tangentially with respect to the eye portion 2. Hence a connecting wire of this particular shape can be used so that the straight portion is either on the left side or on the right side of the eye. Consequently, if a number of such wires are assembled with a stack of rectifier pellets so that the wire is placed alternately in the two positions just mentioned, then each two adjacent wire portions 1 are always properly spaced from each other. Such a rectifier will be described below with reference to FIGS. 8 to 10.

In the embodiment according to FIG. 2, the area portion 2 of the connecting wire forms a circular eye relative to which the straight portion 1 extends in the direction of a diameter. If desired, the connecting portion 1 may also extend in the direction of a chord of such an eye.

In the embodiment of FIG. 3, the area-covering electrode portion 3 of the wire has the shape of a spiral for providing a larger area of contact engagement with the rectifier pellet.

In the embodiment of FIG. 4, the eye portion of the wire is polygonal, being bent to a generally square or rectangular shape. This shape can be chosen in adaptation to the peripheral shape of the rectifier plates which are to be stacked together with the electrode portion 4 to form the rectifier column. However, an area shape generally according to FIG. 4 may also be used in conjunction with circular rectifier pellets.

In the embodiments of terminal wires described with reference to FIGS. 1 to 4, the area-forming portions which are located within the rectifier stack of a completed unit, are all located at one end of the wire. In contrast thereto, the terminal wire according to FIG. 5 has an eye-shaped portion 5 located approximately in the middle between the two protruding, straight end portions 1a and 1b which may have any desired angular position relative to each other.

The terminal wire shown in FIG. 6 is provided with a double loop 6, generally in the shape of an 8, which is located in the middle of the wire. In this manner, the contacting area of the electrode portion of the wire can be increased. The two connector portions 1a and 1b of the wire protrude away from the eye portion in opposite directions and may form any desired angle relative to each other.

The embodiment shown in FIG. 7 consists of a wire whose middle portion is shaped at 8 to a double loop or meander, the two connector portions 1a and 1b extending away from the loop portion 8 either in parallel as illustrated, or in any other angular relation to each other.

An example of a complete rectifier unit and its manufacture will now be described with reference to FIGS. 8 to 10. The illustrated unit comprises three terminal wires of the kind shown in FIG. 1, the straight connector portion of each wire being denoted by 11a and the eye-shaped electrode portion by 11b.

For assembling the rectifier unit, an auxiliary stencil or jig 9 in form of a plate or board is provided. The mounting plate 9 has a number of parallel bores 10 corresponding to the number of terminal wires required for the rectifier unit to be produced. In the illustrated embodiment, the plate 9 has three bores 10 for assembling a rectifier unit with two stacks of rectifier disks or pellets 12 requiring a total of three terminals. The three bores 10 are arranged on the corners of an equilateral triangle (FIG. 10).

The assembling work is done as follows. First, the straight connector portions 11a of the three terminal wires are inserted into the respective bores 10 so that the eye portions 11b are all located above plate 9 (FIGS. 8, 9) in coaxial relation to each other. Now, the rectifier pellets 12 are inserted between the eye portions of the three wires. Thereafter, a sleeve 13, cut from a hose of synthetic resin, is shoved onto the assembly of rectifier pellets and eye portions. The sleeve 13, as explained above, may consist of pre-stretched polyvinyl chloride hose material. When such hose material is subjected to heating for a short interval of time, it shrinks from its frozen or pre-stretched shape to smaller dimensions, thus contracting on the rectifier stack and imposing the necessary contact pressure between the eye-shaped terminal portions and the rectifier pellets.

The mounting plate 9 can further be used as a holding device for the rectifier stack for the purpose of immersing it in a bath of synthetic resin, preferably a casting resin, as explained above. In this manner, a casing 14 is formed around the sleeve 13 and over the rectifier components not covered by the sleeve 13. Thereafter, the completed device can be taken out of the bores 10 of the mounting plate 9. If the auxiliary plate 9 consists of suitable insulating material, it may also be used as a holder for testing the completed rectifier unit as to its electric properties before removing the unit from the plate.

In cases where the rectifier pellets are particularly small, the holding of such pellets during assembly work and the forming of the pellets with the terminal wires is difficult. However, in such cases, too, our invention affords a considerable improvement. Such rectifier pellets can be placed into a recess or groove of an auxiliary holding plate. If the small pellets have the shape of a circular disk, each pellet can be inserted into a center hole of a frame of insulating material having the same or a different peripheral shape and preferably a smaller thickness than the pellet. For providing the necessary electric contact between the electrodes of the rectifier pellet and the area structures of the connecting wires, the rectifier pellet is first covered on both sides by metal disks, and the planar, bent portion of the connecting wires are then placed flat against the metal plates. The area portions of the connecting wires together with the rectifier pellets and the insulating frame as well as the auxiliary contact disks then form together a rectifier stack which has an only slightly larger dimension perpendicularly to its axial direction as is otherwise the case relative to the size of the pellet. In this manner, however, a rectifier unit composed of rectifier pellets of very small area satisfies the requirements of actual practice according to which such a unit must have sufficient mechanical stability and must also permit being assembled and mounted in just as simple a manner as a rectifier unit composed of larger pellets. When thus assembling a unit from extremely small pellets, a sleeve of plastic material can be conveniently shoved onto the stack and can then be heat-treated on the stack in order to relax the pre-stretched condition of the insulating sleeve and placing the stack under compression. Thereafter, if desired, the entire assembly can be immersed in a casting resin in the manner already described.

A rectifier unit made in accordance with the just-mentioned features is illustrated in FIG. 11 on greatly enlarged scale. The unit is provided with two connecting terminal wires 15 and 16, each of which has an area portion in form of an eye 15a or 16a. The unit further comprises two contact plates 17 and 18 of metal, such as copper. These plates are in face-to-face contact with a rectifier pellet 19. The small pellet 19 is inserted into a ring 20 of insulating material with slight clearance. The stack thus composed is enclosed within an insulating sleeve 13 and is surrounded by a casing 14 of casting resin as described above in conjunction with the embodiments of FIGS. 8 to 10.

The synthetic plastics used for the sleeves 13 or the casting resin of the casing 14 may be provided with admixtures such as stone meal, kaolin, aluminum oxide or other metal oxides serving as accelerator for the hardening and/or as a means for improving the heat conductance of the insulating material.

We claim:

A dry rectifier unit, comprising a rectifier pellet having planar surfaces, non-springing contact members consisting each of a bendable wire having a loop portion defining a planar portion and having a connector portion extending away from said loop portion, said pellet and said loop portions being stacked together, and an open-ended insulating sleeve of synthetic plastic tightly enclosing the stack and having an axis transverse to that of the stack, said connector portions of said wires extending through the same open end of said sleeve away from the stack, said pellet having a smaller diameter than said loop portions, an insulating ring member for said pellet, said pellet being inserted with clearance in said ring member, two metal discs adjacent to said ring member on opposite sides respectively thereof, said discs having a larger diameter than the internal diameter of said ring member, and said loop portions being in face-to-face contact with said respective discs.

References Cited in the file of this patent

UNITED STATES PATENTS

| | | |
|---|---|---|
| 2,338,890 | Zierdt | Jan. 11, 1944 |
| 2,467,811 | Cheeseman et al. | Apr. 19, 1949 |
| 2,737,618 | Eisler | Mar. 6, 1956 |
| 2,758,261 | Armstrong | Aug. 7, 1956 |
| 2,783,417 | Eannarino | Feb. 26, 1957 |
| 2,788,474 | Jackson | Apr. 9, 1957 |
| 2,813,326 | Liebowitz | Nov. 19, 1957 |
| 2,836,878 | Shepard | June 3, 1958 |
| 2,906,931 | Armstrong | Sept. 29, 1959 |

FOREIGN PATENTS

| | | |
|---|---|---|
| 584,549 | Great Britain | Jan. 17, 1947 |